United States Patent Office 3,477,953
Patented Nov. 11, 1969

3,477,953
SEQUESTRATION OF METAL IONS WITH HYDROXYALKYL PHOSPHINE OXIDES
Ronald H. Carlson, Lewiston, N.Y., assignor to Hooker Chemical Corporation, Niagara Falls, N.Y., a corporation of New York
No Drawing. Filed Nov. 29, 1966, Ser. No. 597,542
Int. Cl. C02b 5/06
U.S. Cl. 252—175    6 Claims

ABSTRACT OF THE DISCLOSURE

Metal ions, such as iron ions, are sequestered from aqueous solutions by treatment with hydroxyalkyl phosphine oxides. Tris(hydroxymethyl) phosphine oxide was found to be a superior sequestrant for iron.

---

This invention relates to a novel method for sequestering metal ions.

The use of complexing agents which combine with metal ions in solution to form soluble complexes (which agents are commonly referred to as sequestrants) is of great importance in many industrial processes inasmuch as it may prevent undesired precipitation reactions from occurring. Not all sequestrants, however, are equally effective, their activity varying with their structures and the conditions under which they are used; for example, the common carboxylic acid sequestrants are often ineffective in preventing ferric ion precipitation from alkaline solutions of pH greater than 8.

It is an object of this invention to provide a method for sequestering metal ions. It is a further object of this invention to provide a particularly effective method for complexing ferric ions in alkaline solutions.

In accordance with this invention, a method of sequestering at least one metal ion comprises adding a compound of the formula

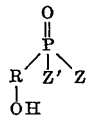

wherein R is an alkylene group of from 1 to 3 carbon atoms, and Z and Z' are independently selected from the group consisting of hydroxyl, alkyl groups of from 1 to 3 carbon atoms, and alkanol groups of from 1 to 3 carbon atoms, to a solution in which said metal ion is present.

The use of the following compounds as sequestrants is, for example, within the scope of this invention:

bis(hydroxymethyl)methylphosphine oxide;
bis(hydroxymethyl)phosphinic acid;
bis(hydroxymethyl)3-hydroxypropylphosphine oxide;
bis(hydroxymethyl) 1-hydroxypropylphosphine oxide;
bis(hydroxymethyl) 2-hydroxypropylphosphine oxide;
bis(hydroxymethyl)propylphosphine oxide;
bis(hydroxymethyl)2-hydroxyethylphosphine oxide;
bis(hydroxymethyl) 1-hydroxyethylphosphine oxide;
bis(2-hydroxyethyl)hydroxymethylphosphine oxide;
bis-(1-hydroxyethyl) hydroxymethylphosphine oxide;
hydroxymethyl-2-hydroxyethylphosphinic acid;
hydroxymethyl-1-hydroxyethylphosphinic acid;
hydroxymethyl-2-hydroxyethylethylphosphine oxide;
hydroxymethyl-1-hydroxyethylethylphosphine oxide;
bis(3-hydroxypropyl)hydroxymethylphosphine oxide;
bis(1-hydroxypropyl)hydroxymethylphosphine oxide;
bis(2-hydroxypropyl)hydroxymethylphosphine oxide;
hydroxymethyl-2-hydroxyethylphosphinic acid;
hydroxymethyl-1-hydroxyethylphosphinic acid;
hydroxymethyl-3-hydroxypropylethylphosphine oxide;
hydroxymethyl-1-hydroxypropylethylphosphine oxide;
hydroxymethyl-2-hydroxypropylethylphosphine oxide;
bis(2-hydroxyethyl)phosphinic acid;
bis(2-hydroxyethyl)-3-hydroxypropylphosphine oxide;
bis(2-hydroxyethyl)ethylphosphine oxide;
bis(2-hydroxyethyl)methylphosphine oxide;
tris(hydroxymethyl)phosphine oxide;
2-hydroxyethylmethylpropylphosphine oxide;
2-hydroxyethylmethylphosphinic acid;
bis(2-hydroxyethyl)propylphosphine oxide;
bis(propyl)2-hydroxyethylphosphine oxide;
2-hydroxyethylmethyl-3-hydroxypropylphosphine oxide;
2-hydroxyethylpropyl-3-hydroxypropylphosphine oxide;
3-hydroxypropylhydroxymethyl-2-hydroxyethyl phosphine oxide;
bis(3-hdroxypropyl) hydroxymethyl phosphine oxide;
2-hydroxypropylhydroxymethylethylphosphine oxide;
3-hydroxypropylhydroxymethylethylphosphine oxide;
bis(2-hydroxyethyl)-2-hydroxypropylphosphine oxide;
2-hydroxypropyl 2-hydroxyethylethylphosphine oxide;
2-hydroxypropyl-2-hydroxyethylpropylphosphine oxide;
hydroxymethylpropylphosphinic acid;
hydroxymethylmethyl-2-hydroxyethylphosphine oxide;
bis(methyl)hydroxymethylphosphine oxide;
hydroxymethylmethylethylphosphine oxide;
bis(hydroxymethyl)ethylphosine oxide;
hydroxymethylethyl-3-hydroxypropylphosphine oxide;
hydroxymethylethylphosphinic acid;
bis(ethyl)hydroxymethylphosphine oxide;
hydroxymethylpropyl-3-hydroxypropylphosphine oxide;
hydroxymethylpropylphosphinic acid;
hydroxymethylethylmethylphosphine oxide;
bis(propyl)hydroxymethylphosphine oxide;
hydroxymethylpropyl-2-hydroxypropylphosphine oxide;
hydroxymethylethyl-1-hydroxypropylphophine oxide;
tris(2-hydroxyethyl)phosphine oxide;
tris(1-hydroxyethyl)phosphine oxide;
bis(2-hydroxyethyl)-1-hydroxypropylphosphine oxide;
bis(2-hydroxyethyl) phosphinic acid;
bis(2-hydroxyethyl)methylphosphine oxide;
bis(2-hydroxyethyl)propylphosphine oxide;
hydroxymethylphosphonic acid;
1-hydroxyethylphosphonic acid;
2-hydroxyethylphosphonic acid;
1-hydroxypropylphosphonic acid;
2-hydroxypropylphosphonic acid;
and the like.

Each of the aforementioned compounds is effective in sequestering metal ions. It is preferred to use said compounds as sequestrants for the ions of metals of groups III–A and IV–A of the periodic table, and for ions of the transition and rare earth metals. It is more preferred to use said compounds as sequestrants for the ions of the transition metals, and it is most preferred to use said compounds as sequestrants for ferric ions.

Some of the metals whose ions may be sequestered by the compounds of this invention include, e.g., iron, aluminum, copper, nickel, chromium, tin, lead, gadolinium, europium, neodymium, and the like.

The above compounds find may uses a sequestrants. They may, for example, be used in detergents, in metal cleaning baths, in dye solutions, to stabilize peroxide solutions and for other similar purposes.

In a preferred embodiment of this invention, those compounds in which Z and Z' are selected from the group consisting of hydroxyl and alkanol of from 1 to 3 carbon atoms are employed. In a more preferred embodiment of the invention, those compounds in which Z and Z' are selected from the group consisting of hydroxyl, —$CH_2OH$, and $C_2H_4OH$ and wherein R is an alkyl group of from 1 to 2 carbon atoms, are used as sequestrants. In the most preferred embodiment of the invention, the compounds

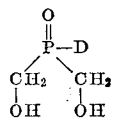

wherein D is selected from the group consisting of OH and CH₂OH are used. For example, tris(hydroxymethyl) phosphine oxide, which is of the formula

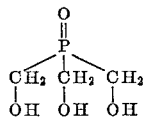

is an outstanding ferric ion sequestrant.

The aforementioned compounds may be used as sequestrants in solutions wherein the pH is from 1–14, though they tend to be more effective in alkaline solutions. Accordingly, it is preferred to use these compounds as sequestrants for solutions whose pH's are from about 7 to about 14, and it is even more preferred to use said compounds as sequestrants for those solutions whose pH's are from about 10 to about 14.

Said compounds, when added to those solutions in which sequestration is desired, may be added as solids or solutions. If it is desired to add said compounds as solutions, the compounds may be dissolved in polar solvents such as water; mixtures of water and lower alkanols of from 1 to 4 carbon atoms wherein up to about 50 percent of said mixtures is comprised of alkanol; and the like. From about 0.001 percent to about 25 percent concentration (by weight) may be used (Percent concentration [by weight]=

$$\frac{\text{weight of sequestrant} \times 100}{\text{weight of sequestrant} + \text{weight of solvent [if any] in which sequestrant is dissolved before being added to solution to be sequestered} + \text{weight of solution to be sequestered [prior to the time sequestrant is added]})}$$

though it is preferred to use from about 0.01 to about 5 percent concentration (by weight), and it is even more preferred to use from about 0.1 to about 3 percent concentration (by weight).

It is preferred to use said compounds as sequestrants in aqueous solutions, such as water solutions; solutions containing mixtures of water and lower alkanols of 1 to about 4 carbon atoms wherein up to about 50 percent of said mixtures is comprised of alkanol; and the like. When said compounds are added to the solutions to be sequestered, the temperatures of said solutions may be from about 0 to about 100 degrees centigrade, though it is preferred that said temperatures be from about 20 to about 70 degrees centigrade, and it is even more preferred that said solutions be at ambient temperatures.

The following examples are illustrative of the invention, and are not to be deemed limitative thereof. Unless otherwise specified, parts are by weight and temperatures are in degrees centigrade.

EXAMPLE 1

0.4 parts of ferric chloride dissolved in 5 parts of water were added to a solution of 0.25 parts of sequestrant in 5 parts of water, and the pH of the resulting mixture was adjusted to 11. A slurry was obtained, and the slurry was then magnetically stirred for about 60 hours to cause the sequestrant to combine with as much of the ferric ion as it could hold. The slurry was then centrifuged, and the supernatant liquid was analyzed for ferric ion content by X-ray fluorescence technique. For every 100 parts of ethylenediaminetetraacetic acid sequestrant added, 5.68 parts of ferric ion were sequestered. This sequestering activity of ethylenediaminetetraacetic acid was assigned a value of 1.00, and the sequestering power values of the other sequestrants were calculated in relation to the activity of ethylenediaminetetraacetic acid (e.g., a complexing agent, 100 parts of which sequestered 11.36 parts of ferric ion, would have a sequestering activity of 2). The following results were obtained:

Sequestering agent: Sequestering activity [1]
  Tris(hydroxymethyl) phosphine oxide _____ 6.08
  Gluconic acid _____ 4.50
  Ethylenediaminetetraacetic acid _____ 1.00
  Nitrilotriacetic acid _____ 0.06
  Nitrilotrimethylene phosphonic acid _____ 0.14

[1] Relative to an assigned sequestering activity of 1.00 for ethylenediaminetetraacetic acid, 100 parts of which sequestered 5.68 parts of ferric ion.

It is noteworthy that Tris(hydroxymethyl) phosphine oxide is about 1.4 times as effective a sequestrant as gluconic acid, which latter compound is regarded by those skilled in the art as being a very efficient ferric ion sequestrant. Tris(hydroxymethyl) phosphine oxide is about 6 times as efficient as ethylenediaminetetraacetic acid in sequestering ferric ion, and is about 100 times as effective a ferric ion sequestrant as is nitrilotriacetic acid.

When compounds of the formula

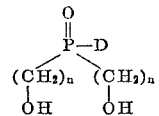

wherein $n$ is from 1 to 3 and D is selected from the group of $(CH_2)_nOH$, $CH_2OH$, and OH are used, it is found that they are effective sequestrants. Said compounds exhibit sequestering activity in both acid and alkaline solutions, but are especially effective in alkaline solutions wherein the metal ions to be sequestered are selected from the group consisting of ferric ion, cupric ion, nickel ion, chromium ion, and aluminum ion.

When the procedure of Example 1 is followed, with chromium chloride being used in place of ferric chloride, similar results are obtained, the chromium ion being complexed as was the ferric ion in Example 1.

EXAMPLE 2

Three parts of the sequestrant to be tested were dissolved in 27 parts of water, and the pH of the solution was adjusted to 10. Into this solution was titrated one molar ferric chloride aqueous solution, and this titration was continued until the first sign of cloudiness appeared in the solution (indicating that all of the sequestering activity of the sequestrant to be tested had been exhausted). During said titration the pH of said solution was maintained at 10. The following results were obtained:

Sequestrant tested Parts [1]
  Tris(hydroxymethyl)phosphine oxide _____ 4.1
  Bis(hydroxymethyl)phosphinic acid _____ 0.4
  Bis(hydroxymethyl)methylphosphine oxide ___ 0.3

[1] Parts of ferric chloride added to solution before cloudiness appeared.

Similar results are obtained when the three aforementioned compounds are used as sequestrants for other metal ions.

While the invention has been described with reference to certain specific embodiments, it will be recognized by those skilled in the art that many variations are possible without departing from the spirit and scope of the invention.

What is claimed is:

1. A method for sequestration of a metal ion selected from the group consisting of ions of metals of Group IIIA, Group IVA, the transition metals and rare earth metals, which comprises reacting with such ion in solution, tris(hydroxymethyl)phosphine oxide.

2. A method according to claim 1 wherein the metal is either iron, aluminum, nickel, chromium, tin, lead, gadolinium, neodymium, or europium.

3. A method according to claim 1 wherein the metal ion is ferric ion.

4. A method according to claim 1 wherein the metal ion to be sequestered is an iron ion in aqueous solution and the tris(hydroxymethyl)phosphine oxide is added to said solution.

5. A method according to claim 1 wherein the metal ion to be sequestered is ferric ion, the temperature of the solution is from 20° to 70° C., the solution is aqueous, and the pH thereof is from 10 to 14.

6. A method according to claim 5 wherein the solution to be treated is at ambient temperature and the pH thereof is 10–11.

References Cited

UNITED STATES PATENTS

| | | | |
|---|---|---|---|
| 2,758,971 | 8/1956 | Mikeska | 252—32.7 |
| 3,291,840 | 12/1966 | Buckler et al. | 260—606.5 |

OTHER REFERENCES

Kuskov et al.: Chem. Abst. vol. 52 (1958), col. 19913, Abstract of Doklady Akad. Nauk S.S.S.R., 120, p. 786–8 (1958).

Goodgame et al.: J. Chem. Soc., 1961, pp. 2298–2304.

TOBIAS E. LEVOW, Primary Examiner

A. P. DEMERS, Assistant Examiner

U.S. Cl. X.R.

252—89, 156; 260—429, 429.2, 429.3, 429.5, 429.7, 435, 435.1, 438.5, 439, 448, 606.5